US012590627B2

(12) United States Patent
Haupt et al.

(10) Patent No.: US 12,590,627 B2
(45) Date of Patent: Mar. 31, 2026

(54) DIFFERENTIAL ASSEMBLY AND ACTUATOR ASSEMBLY FOR FRICTION DISK CLUTCH

(71) Applicant: GKN Automotive Limited, Birmingham (GB)

(72) Inventors: Jan Haupt, Lohmar (DE); Hanspeter Putzer, Bruneck (IT); Thomas Messner, Bruneck (IT)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/809,895

(22) Filed: Aug. 20, 2024

(65) Prior Publication Data

US 2025/0067328 A1     Feb. 27, 2025

(30) Foreign Application Priority Data

Aug. 25, 2023     (DE) ..................... 10 2023 122 917.6

(51) Int. Cl.
| | |
|---|---|
| *F16H 48/22* | (2006.01) |
| *F16H 48/10* | (2012.01) |
| *F16H 48/30* | (2012.01) |
| *F16D 23/12* | (2006.01) |
| *F16D 125/28* | (2012.01) |

(52) U.S. Cl.
CPC ............. *F16H 48/22* (2013.01); *F16H 48/30* (2013.01); *F16D 23/12* (2013.01); *F16D 2023/123* (2013.01); *F16D 2125/28* (2013.01); *F16H 2048/305* (2013.01)

(58) Field of Classification Search
CPC ..................................... F16H 48/20–2048/346
See application file for complete search history.

(56) References Cited

U.S. PATENT DOCUMENTS

| | | | | |
|---|---|---|---|---|
| 6,436,002 | B1 | 8/2002 | Ishikawa et al. | |
| 6,537,172 | B1 * | 3/2003 | McAuliffe, Jr. | ........ F16H 48/34 475/231 |
| 6,561,939 | B1 * | 5/2003 | Knapke | ................... F16H 48/22 192/84.6 |
| 11,221,065 | B2 * | 1/2022 | Zink | ....................... F16H 48/30 |

(Continued)

FOREIGN PATENT DOCUMENTS

| | | |
|---|---|---|
| DE | 3212495 A1 | 10/1983 |
| DE | 3733771 A1 | 4/1988 |

(Continued)

*Primary Examiner* — Tinh T Dang
(74) *Attorney, Agent, or Firm* — Reising Ethington P.C.

(57) ABSTRACT

An actuator assembly comprises a housing part with a sleeve-shaped portion and a flange-shaped portion, a ball ramp mechanism with a support ring and an setting ring, wherein at least the support ring is radially spaced from an outer face of the sleeve-shaped portion; an actuating element which is held axially movably coaxially to the ball ramp mechanism on the flange-shaped portion of the housing part, an annular gap being formed between the outer face of the sleeve-shaped portion and the actuating element; and a spring element which is arranged radially outside an actuating face of the actuating element axially between the housing part and the actuating element in order to exert a restoring force on the actuating element. A differential assembly with such an actuator assembly is provided.

15 Claims, 6 Drawing Sheets

(56)         References Cited

U.S. PATENT DOCUMENTS

| 11,796,043 B1 * | 10/2023 | Hirota | F16H 48/08 |
|---|---|---|---|
| 2020/0292045 A1 * | 9/2020 | Fukuda | F16H 48/145 |
| 2021/0348675 A1 * | 11/2021 | Zink | F16D 23/12 |
| 2025/0083517 A1 * | 3/2025 | Kenmotsu | B60K 1/00 |

FOREIGN PATENT DOCUMENTS

| DE | 102008037885 B4 | 3/2010 |
|---|---|---|
| DE | 102014113937 B3 | 3/2016 |
| EP | 3354920 A1 | 8/2018 |
| JP | 2008248900 A | 10/2008 |
| WO | 2005064206 A1 | 7/2005 |
| WO | 2007071314 A1 | 6/2007 |

* cited by examiner

DIFFERENTIAL ASSEMBLY AND ACTUATOR ASSEMBLY FOR FRICTION DISK CLUTCH

CROSS-REFERENCE TO RELATED APPLICATIONS

This application claims priority to German Application No. DE 10 2023 122 917.6, filed on Aug. 25, 2023, which application is hereby incorporated herein by reference in its entirety.

BACKGROUND

Friction disc clutches are used, for example, in lockable differential gearings in which, by operating the clutch, a locking torque is built up between the differential case and one of the side shaft gears and thus indirectly between the side shaft gears. In this way, a torque introduced into the differential case can be effectively built up or established on both side shaft gears respectively even if there is no counter-torque on one of the side shaft gears. Differential gearings of the type mentioned can be used in motor vehicles as axle differentials between the vehicle wheels of a drive axle or as center differentials between two drive axles. They are also marketed by the applicant under the designation "Electronic Controlled Torque Manager" (ETM®).

A differential gearing is known from WO 2005/064206 A1, in which the differential case has a cup-shaped case part, in which the side shaft gears and differential gears are accommodated, and a cup-shaped cover attached thereto, in which the discs of the multi-disc clutch are accommodated. A ball ramp mechanism is provided for actuating the disc clutch, which is arranged outside the differential case on a sleeve portion of the cover. The ball ramp mechanism converts a rotary movement into an axial movement, which is transmitted to a pressure plate of the disc clutch via several circumferentially distributed actuating elements that extend axially through openings in the cover.

A differential gearing with a controllable friction clutch is known from U.S. Pat. No. 6,537,172 B1. The friction clutch is arranged axially adjacent to one of the output gears and can be operated between an engaged state, in which relative rotation between the output gears and the differential case is suppressed, and a disengaged state. The friction clutch is controllable by an electromagnetically actuated ball ramp actuator, which is arranged adjacent to the opposite output gear. A plurality of elongated engagement parts distributed over the circumference are provided, which extend axially from the ball ramp actuator through the differential case to the friction clutch in order to transmit a ramp effect of the ball ramp actuator axially to the friction clutch.

A differential arrangement with two friction clutches for variable torque distribution between two shafts in the driveline of a motor vehicle is known from WO 2007/071314 A1. The two friction clutches are each controllable by a ball ramp arrangement, which can be actuated by a common actuator.

From EP 3 354 920 A1, a transmission arrangement with a friction disc clutch is known that is controllable by a ball ramp arrangement.

From DE 10 2014 113 937 B3, a driveline is known with a propeller shaft that can be optionally connected or disconnected by means of clutches. An upstream clutch comprises a friction disc pack and can be actuated by a ramp arrangement.

SUMMARY

The disclosure herein relates to an actuator assembly, including for actuating a controllable friction disc clutch for locking a differential gearing. The disclosure also relates to a differential assembly with such an actuator assembly. The actuator assembly for operating a controllable friction disc clutch has a simple and compact design. The disclosure further relates to a differential assembly with such an actuator assembly.

An actuator assembly as disclosed herein comprises: a housing member having a sleeve portion and a flange-shaped portion; a ball ramp mechanism having a support ring which is axially supported and a setting ring which is axially movable, wherein at least one of the support ring and the setting ring is rotatably drivable by a drive source, and an induced rotary motion is converted into an axial motion of the setting ring, and wherein at least the support ring is radially spaced from an outer face of the sleeve portion of the housing member; an actuating element which is held axially movably on the flange portion of the housing member coaxially with the ball ramp mechanism, wherein an annular gap is formed between the outer face of the sleeve portion and the annular actuating element, wherein the annular actuating element is axially supported on one side at least indirectly against the setting ring and has an actuating face on the other side for acting on a friction disc clutch; and at least one spring element which is arranged radially exterior respectively outside the actuating face of the actuating element axially between the housing member and the actuating element in order to exert a resilient restoring force on the annular actuating element which is opposed to the actuating force of the ball ramp mechanism.

The actuator assembly is suitable for controlling the transmittable torque of a friction disc clutch in the driveline of a motor vehicle; it can also be referred to as actuator arrangement or axial setting device. The clutch can be arranged inside and the actuator outside the housing. To actuate/operate the clutch, force transmission elements, for example bolts or pins, can be provided in the housing, which extend through through-holes in the housing in order to transmit an actuating force from the actuator to the clutch. The through openings can extend through the flange-shaped portion that forms a side wall of the housing. The actuator is reset, respectively restored, via the spring element, wherein it is understood that one or more spring elements can be provided. The spring element is functionally arranged outside the force flow formed between the actuating element and the clutch, including radially outside/externally of the through openings and/or the force transmission elements extending therethrough. This reduces the installation space between the housing and the actuating element by the space required by the spring.

The ball ramp assembly is drivingly rotatable by a drive source, for example a controllable electric motor, and is designed to convert an introduced rotary movement into an axial movement. For this purpose, the setting ring and the support ring can each have ball ramps with a decreasing depth in the same circumferential direction when viewed on the end faces. A ball is respectively accommodated in each pair of opposing ball grooves, via which the setting ring and the support ring are axially supported against each other. Thereby, the setting ring can be radially positioned relative to the support ring, possibly exclusively via the balls. No further radial bearing is required for the setting ring, so that an annular gap can be formed between the outer face of the sleeve portion and the setting ring. This in turn has a positive effect on the design freedom for the sleeve portion, which can be optimised in terms of installation space and stress.

According to an embodiment, the actuating element has a flange portion which comprises the pressure face and has a radial overlap with the through openings or the force transmission elements, and a centring section which extends from a radially outer end of the flange portion in the axial direction and embraces around the housing part. Due to this configuration, also the actuating element is kept free, i.e., separated from the sleeve portion of the housing part, which has the aforementioned advantage with regard to the design of the housing part.

The centring section of the actuating element can have an inner circumferential face, which can be guided axially movably on an outer circumferential face of the housing part. This means that the actuating element is radially centered and axially movably guided relative to the housing part via the centring section extending in the axial direction. The centring section can be sleeve-shaped, i.e., with a circumferentially closed wall, or can comprise several guide elements distributed over the circumference and extending in the axial direction, which grip around the housing.

According to an embodiment, a receiving space for the spring element is formed between the flange portion of the actuating element and a side wall of the housing part. The receiving space can have a larger axial extension than the smallest axial distance between the support face of the actuating element and the side face of the housing. This means that the axial length of the spring does not affect the arrangement of the actuating element, resulting in an axially compact design overall. The receiving space is possibly arranged radially outside, i.e., externally of the through openings and/or the force transmission elements extending therethrough.

The spring element can have any design that is suitable for moving the actuating element back in the initial direction against the operating direction of the setting ring. For example, the spring can be ring-shaped with a coaxial arrangement to the actuating element and held radially on a circumferential face of the actuating element. In order to prevent jamming, the spring is arranged with radial play with respect to a circumferential surface of the parts delimiting the receiving space. The annular spring can be held radially outwards with respect to an inner circumferential surface of the centring section, or radially inwards with respect to an outer circumferential surface of a shoulder or a sleeve projection of the housing, respectively flange portion. In particular, the spring element can be designed as a wave spring or disc spring, although other designs are also possible, such as several coil springs distributed around the circumference.

According to an embodiment, an axial bearing can be arranged between the setting ring and the actuating element. The axial bearing, which can also be designated thrust bearing, transmits axial forces between the setting ring and the actuating element, both in the closing direction and in the opening direction. At the same time, the axial bearing decouples relative rotational movements of the two elements in relation to each other. The axial bearing can be supported radially on the outside of the actuating element so that a radial gap is formed radially on the inside between the bearing and the housing. To accommodate the axial bearing, the actuating element can have an axially protruding collar in which the axial bearing is accommodated. Optionally, a washer can also be provided between the actuating element and the axial bearing. The washer can be supported radially on the outside of the actuating element via the collar. By designing the actuating element with an outer collar respectively sleeve for centring on the housing and/or with a collar for the axial bearing, the actuating ring is additionally reinforced and force-induced elastic deformation of the actuating ring is reduced. This leads to an improved response behaviour of the clutch and a favourable load-bearing pattern over the circumference during power transmission. This results in a long service life for the bearing.

According to an embodiment, the support ring of the ball ramp mechanism is rotationally drivable by a drive source, while the setting ring is rotationally fixed and axially movable. However, it is understood that other embodiments are also possible, for example that the setting ring is rotationally drivable and axially movable, while the supporting disc is rotationally fixed and axially supported. The support ring and setting ring have ball grooves that vary in depth in the circumferential direction on their facing end faces. The ball ramp mechanism can be designed in such a way that the centers of the balls held in the ball grooves have a radial overlap with the axial bearing and/or the support bearing for the support ring. This results in an advantageous axial force transmission with low tilting moments.

According to an embodiment, the sleeve-shaped portion of the housing part has a bearing seat on which a rotary bearing for the support ring is mounted. The housing part comprises between the axial side face and the bearing face of the sleeve portion a concave transition portion which extends axially from the side face at least as far as the setting ring. The transition portion has a free outer face, possibly at least as far as the support ring, which means that no components are mounted on the housing part between the side face and the support ring or the support bearing. This section of the housing part, which is subject to high forces during operation, can therefore be designed to optimise stresses, which also has a favourable effect on the service life of the arrangement.

In further specification, a smallest outer diameter of the concave transition portion can be smaller than the outer diameter of the bearing seat for the rotary bearing. Alternatively or additionally, the concave transition portion can have a curvature whose radius is at least 0.5 times a smallest axial distance between the setting ring and the flange portion of the housing part, including at least 0.6 times the smallest axial distance. Alternatively or additionally, the smallest outer diameter of the concave transition portion can be smaller than the radius of the outer toothing, i.e. outer spines of the coupling hub. Through one or more of these specifications, the load on the housing part in this section can be reduced.

Further included in this disclosure is a differential assembly comprising: a differential gearing with a differential case which rotatably drivable about an axis of rotation, a plurality of differential gears rotatably supported in the differential case about gear axes extending at an angle to the axis of rotation, and a first side shaft gear and an opposite second side shaft gear mounted in the differential case coaxially to the axis of rotation and meshingly engaging with the differential gears; a friction disc clutch with outer discs, which are connected to the differential case in a rotationally fixed and axially movable manner, and inner discs, which are connected to one of the first and second side shaft gears in a rotationally fixed and axially movable manner, wherein the disc pack formed by the outer discs and inner discs can be acted upon axially via a pressure plate; and an actuator assembly which is designed according to one or more of the above-mentioned embodiments. The differential case comprises the housing part on which the ball ramp assembly is arranged. A plurality of force transmission elements are provided around the circumference, which extend axially through the through openings of the housing part in order to transmit an axial movement of the setting ring to the pressure plate of the disc pack. The ring-shaped actuating element is arranged in particular between the setting ring and the force transmission elements, with the force transmission elements being in contact with a contact face of the actuating element.

According to a first embodiment, the friction disc clutch and the ball ramp mechanism can be arranged on opposite sides of the differential case in relation to a plane spanned by the differential gear axes. The circumferentially distributed force transmission elements extend axially through the differential case, respectively a casing section of the differential case and are guided axially therein. The differential case possibly comprises a first bearing seat and a second bearing seat for being rotatably mounted in a differential housing via suitable bearing elements. A drive gear is firmly connected to the differential case to introduce torque. Possibly, a smallest axial distance between the first and second bearing seat is smaller than a medium toothing diameter of the drive gear.

According to a second embodiment, the friction disc clutch and the ball ramp mechanism can be arranged on the same side of the differential case in relation to the plane spanned by the differential gear axes. In this embodiment, the circumferentially distributed force transmission elements are shorter and extend through the side wall of the differential case and are axially guided therein.

BRIEF SUMMARY OF THE DRAWINGS

Example embodiments are explained below with reference to the drawing figures. Herein.

DESCRIPTION

Figures 1A, 1B:
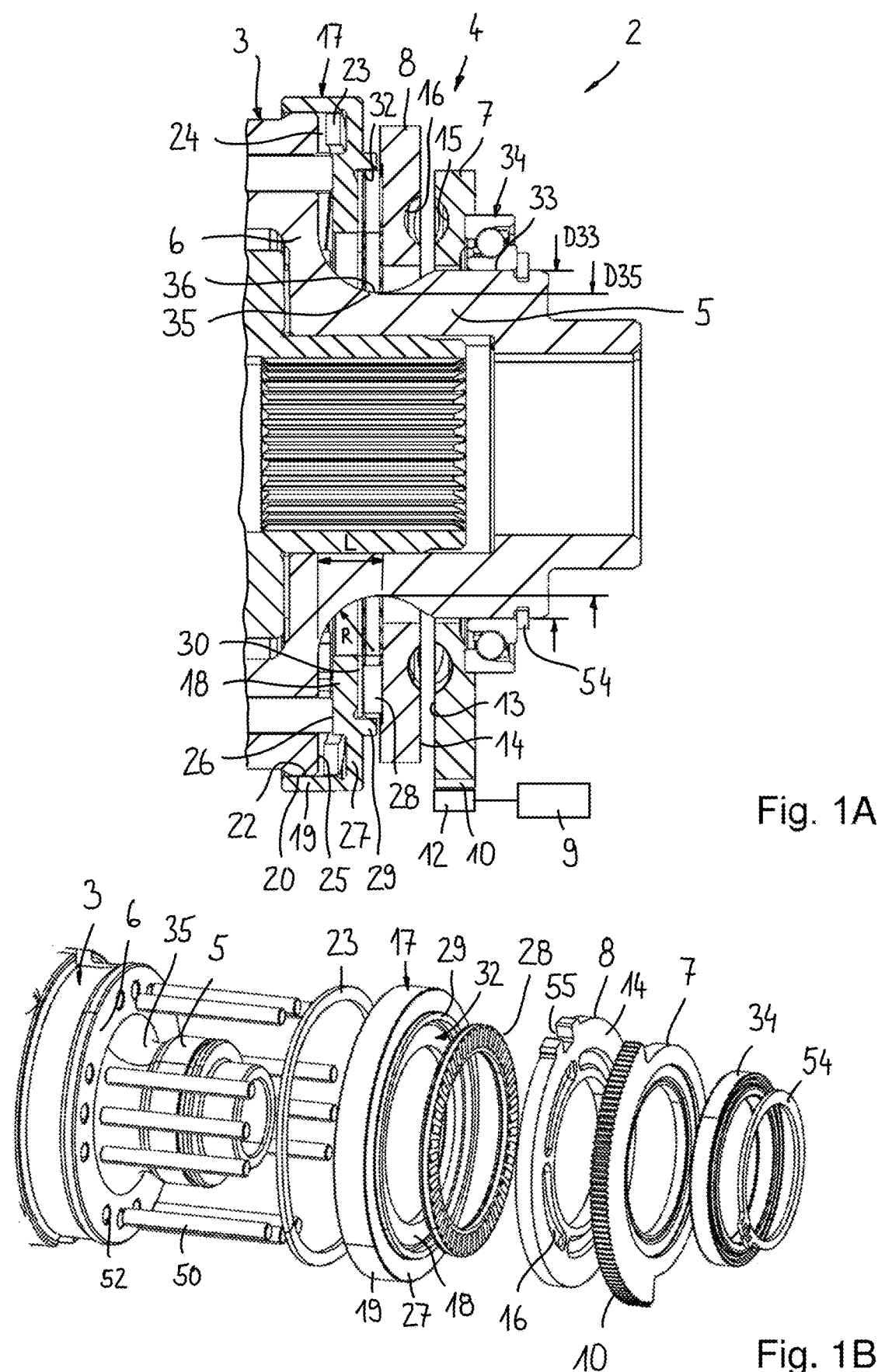
FIG. 1A shows a longitudinal section of an example actuator assembly for a controllable friction disc clutch.
FIG. 1B shows an exploded perspective view of the actuator assembly from FIG. 1A.

FIGS. 1A and 1B, which are described together below, show an exemplary actuator assembly 2, which can be used, for example, to actuate and/or operate a friction disc clutch in the driveline of a motor vehicle.

The actuator assembly has a housing part 3 and a controllable ball ramp mechanism 4, which is arranged coaxially to the housing part and can be driven by a schematically illustrated drive source 9. The housing part 3 can, for example, be part of a gearbox or clutch housing and comprises, in particular, a sleeve-shaped portion 5 and a flange-shaped portion 6, which can also be referred to as sleeve or flange portions for short. The flange-shaped portion 6 extends radially outwards from the sleeve-shaped portion 5 and forms a side wall of the housing.

The ball ramp assembly 4 comprises a support ring 7, which is axially supported against the housing part 3, and a setting ring 8, which is axially movable relative to the support ring. In the present embodiment, the support ring 7 is rotationally drivable by the drive source 9, while the setting ring 8 is held in a rotationally fixed manner by anti-rotation elements 55. For actuation, the support ring 7 has a toothed segment 10 into which a pinion 12 can engage for rotational drive. It is to be understood that other designs are also possible, for example, including a rotatingly drivable setting ring or other forms of torque transmission, such as by a toothed rack or spindle drive.

The support ring 7 and the setting ring 8 each have a plurality of ball grooves 15, 16 extending in circumferential direction on their facing end faces 13, 14, in each of which a ball is guided. The balls are arranged in a different sectional plane than shown and are therefore not visible here. The ball grooves 15, 16 are designed in such a way that a rotary movement introduced into the support ring 7 by the drive source is converted into an axial movement of the setting ring 8 which can also be referred to as actuating ring. For this purpose, the setting ring 8 and the support ring 7 can each have a decreasing depth in the same circumferential direction in a plan view onto the end faces. However, a design in which only one of the two discs has ball grooves is also possible. In the present case, the setting ring 8 is radially supported relative to the support ring 7 exclusively via the balls. Accordingly, no radial bearing relative to the housing part 3 is required, so that in particular the sleeve-shaped portion 5 can be designed favourably with regard to the loads occurring during operation.

An annular actuating element 17 is provided to transmit force between the ball ramp mechanism 4 and the component to be actuated. The actuating element 17 is held or arranged so as to be axially movable on a guide section of the housing part 3 coaxially to the ball ramp mechanism 4. In further detail, the actuating element 17 has a flange portion 18, which serves in particular for axial force transmission, and a centring portion 19, which serves in particular for centring the actuating element 17 on the housing part 3.

The flange portion 18, which can also be referred to as actuating portion, is axially supported on one side against the setting ring 8 and on the other side against the component to be actuated, for example a clutch. An axial movement of the setting ring 8 is thus transmitted to the component via the actuating element 17. It is understood that one or more elements can be interposed between the setting ring 8 and the actuating element 17 on the one hand, and between the actuating element and the component to be actuated on the other. For particularly good axial force transmission, the flange portion 18 can have at least partial radial overlap with the ball grooves 15, 16 and/or with the balls of the ball ramp mechanism 4.

The centring portion 19 extends from a radially outer end of the flange portion 18 in the axial direction and engages around an outer guiding face 20 of the housing part 3. The centring portion 19 of the actuating element 17 can in particular have an inner circumferential face 22, which is axially movably guided on an outer circumferential surface of the housing part 3. The outer circumferential face thus forms on the housing part the guiding face 20 for the actuating element 17. Overall, the actuating element 17 is radially centered and axially movably guided relative to the housing part 3 via the centring portion extending in the axial direction. The centring portion 19 is designed in particular in the shape of a sleeve, i.e., with a circumferentially closed wall, although other designs are also possible, for example with several circumferentially distributed holding elements. With the centring portion 19, the actuating element 17 is advantageously centered radially on the outside and is therefore free of contact with the housing part 3 radially on the inside. The housing part 3 can thus be designed to be load-optimized.

The actuator assembly 2 further comprises a spring element 23, which is arranged axially between the housing part 3 and the actuating element 17 in order to exert a resilient restoring force on the actuating element 17, which counteracts the actuating force of the ball ramp mechanism 4. The spring element 23 is designed in the present case as a wave spring in a coaxial arrangement to the actuating element, wherein it is understood that other spring shapes as return springs are possible. The spring element 23 is accommodated and/or radially held in a receiving space 24 radially outside the flange portion 18 and radially inside the centring portion 19. Axially, the spring element 23 is arranged between the actuating element 17 and a side wall 25 of the housing part 3. The receiving space 24 has a larger axial extension than the smallest axial distance between the actuating face 26 of the actuating element and the side wall 25 respectively side face of the housing. For this purpose, the actuating element 17 has radially outside of the actuating portion an offset portion 27 which is axially offset relative to the actuating portion in the direction of the setting ring 8. However, an alternative design is also possible, in which the flange portion 18 is stepless up to the centring portion 19, but the housing part 3 has a recess or step radially on the outside. Possibly, the receiving space 24 and/or the spring element 23 is arranged radially outside and functionally parallel to the actuating face 26 of the actuating element 17.

In the present embodiment, force is transmitted between the setting ring 8 and the actuating element 17 via an optional axial bearing 28, i.e. thrust bearing. The axial bearing 28 is arranged coaxially to the ball ramp mechanism 4; it transmits axial forces and decouples relative rotational movements. The axial bearing 28 is radially supported with respect to the actuating element 17. For this purpose, the actuating element 17 has an axially protruding, in particular circumferential collar 29 on its side facing the setting ring 8, which forms a recess 32 for the axial bearing 28. An optional washer 30 is also provided between the actuating element 17 and the axial bearing 28. The washer 30 is also accommodated in the recess 32 formed by the circumferential collar.

By designing the actuating element 17 with a centring portion 19 respectively outer collar on the side facing the housing and/or with a collar section 29 respectively inner collar on the side facing the ramp mechanism 4, a high level of rigidity is achieved and force-induced elastic deformation of the actuating element is reduced. This leads to an improved response behaviour of a clutch actuated therewith and a favourable contact or load pattern over the circumference during power transmission.

The actuating element 17, the washer 30, the axial bearing 28, the support ring 7 and the setting ring 8 are radially spaced from an outer face 36 of the sleeve-shaped portion 5 of the housing part. The support ring 7 of the ball ramp mechanism is axially supported against the sleeve portion 5 of the housing part 3. The housing part 3 has a bearing seat 33 on which a rotary bearing 34 is mounted, which is designed in particular as a combined axial/radial bearing.

The bearing 34 is axially supported against the sleeve-shaped portion 5 by a retaining ring 54, although other designs are possible. The housing part 3 has a concave transition portion 35 between the flange-shaped portion 6 and the bearing seat 33, which extends axially from the side face approximately as far as the support ring 7. The transition portion 35 has a free outer face 36, i.e. no components are arranged or mounted on the housing part 3 between the side face and the rotary bearing 34. A smallest outer diameter D35 of the concave transition portion 35 can be smaller than the outer diameter D33 of the bearing seat 33 for the rotary bearing 34. Optionally, the concave transition portion 35 can have a curvature whose radius R is at least 0.5 times a smallest axial distance L between the setting ring 8 and the flange portion 6 of the housing part 3, including at least 0.6 times the smallest axial distance L. These configurations contribute to a reduction in the load on the housing part 3 in this section.

The actuator assembly 2 is particularly suitable for controlling a clutch for a driveline of a motor vehicle, wherein the clutch can be arranged inside and the actuator outside the housing part 3. The actuator is reset, respectively returned via the spring element 23, which is functionally arranged outside the force flow formed between the actuating element 17 and the clutch. This results in a particularly compact design.

FIGS. 2A to 2D, which are described together below, show a differential assembly 37 according to the invention with a friction disc clutch 41 which can be controlled by an actuator assembly 2. The controllable friction disc clutch provides a limited slip in the differential assembly. The differential assembly can also be referred to as differential arrangement or differential unit or limited slip differential.

The differential assembly 37, which can be driven by a drive shaft not shown, is designed to transmit and/or distribute an introduced rotary movement to two side shafts. The differential assembly 37 comprises a differential case 38, which is to be rotatably mounted in a stationary differential housing (not shown) about the axis of rotation A by means of suitable bearings. The differential case 38 is constructed in two parts and comprises the housing part 3 and a cover part 39, which are connected to each other at a connecting flange 40. A crown gear (not shown) drivable by a drive shaft of the motor vehicle, can be attached to the connecting flange 40.

In the differential case 38, a plurality of differential gears 42 are rotatably mounted on pins or bolts 43 arranged perpendicular to the axis of rotation A, which rotate respectively orbit with the differential case 38. The differential gears 42 mesh with two side shaft gears 44, 44', which in turn are to be connected to an associated side shaft in a rotationally fixed manner. For this purpose, the side shaft gears 44, 44' respectively have shaft splines 45, 45', into which the connecting journal of an associated side shaft can be engaged in a rotationally fixed manner. The differential gears 42 and the side shaft gears 44, 44' together form a differential gear set for torque transmission from the differential case 38 to the two side shafts. To accommodate expansion forces, low-friction thrust washers 46, 46', which can also be referred to as sliding washers, are provided between the side shaft gears and the differential case 38.

To control the locking effect of the differential, the friction disc clutch 41 is provided, which is arranged in the cover part 39 without being restricted thereto. The clutch comprises outer discs 47, which are connected to the differential case 38 in a form-fitting, i.e., rotationally fixed and axially movable manner, and inner discs 48, which are connected to one of the two side shaft gears 44' in a rotationally fixed and axially movable manner. The disc pack formed by the outer discs and inner discs can be acted upon axially via a pressure plate 49. The pressure force is controlled by means of the actuator assembly 2, which is shown in FIGS. 1A and 1B, to the description of which reference is made in this respect. The force is transmitted from the actuator to the pressure plate 49 via several force transmission elements 50 distributed around the circumference. The force transmission elements are designed in particular as bolts which extend axially through through-holes 52 in the housing part 3. At one end, the bolts are axially supported against the actuating element 17, and at the other end against the pressure plate 49. An axial movement of the setting ring 8 is transmitted to the pressure plate 49 via the thrust bearing, the actuating element and the force transmission elements.

The pressure plate 49 acts on the disc pack, which reduces a differential movement between the side shaft gear 44' and the differential case 38, and thus also between the two side shaft gears 44, 44'. The torque that can be transmitted by the friction disc clutch 41 can be variably adjusted or controlled as required by controlling the ball ramp mechanism 4 accordingly. The clutch can be fully open, so that the two side shaft gears can rotate freely relative to each other ("open" differential), or fully closed, so that a balancing movement of the side shaft gears is completely blocked ("closed" differential), or it can be operated in any intermediate state, so that a balancing movement between the side shaft gears is partially blocked.

In the embodiment shown in FIGS. 2A to 2D, the friction disc clutch 41 and the ball ramp mechanism 4 are arranged on opposite sides of the differential case 38 with respect to a plane E spanned by the differential gear axes B. The circumferentially distributed force transmission elements 50 extend axially through the casing portion 51 of the differential case 38 and are axially movably guided therein.

At its opposite ends, the differential case 38 comprises a first bearing seat 53 and a second bearing seat 53'. Respective bearings can be mounted to these, with which the differential case 38 can be rotatably supported in a differential housing (not shown). A smallest axial distance L53 between the two bearings and/or bearing seats can be smaller than a mean toothing diameter of the drive flange. The actuating element 17 is arranged at the end of the casing section of the differential case 38 in an axially movable manner. The spring element and the axial bearing are accommodated in the actuating element. Overall, the actuator assembly 2 in conjunction with the differential results in a particularly compact size.

Figure 2A:
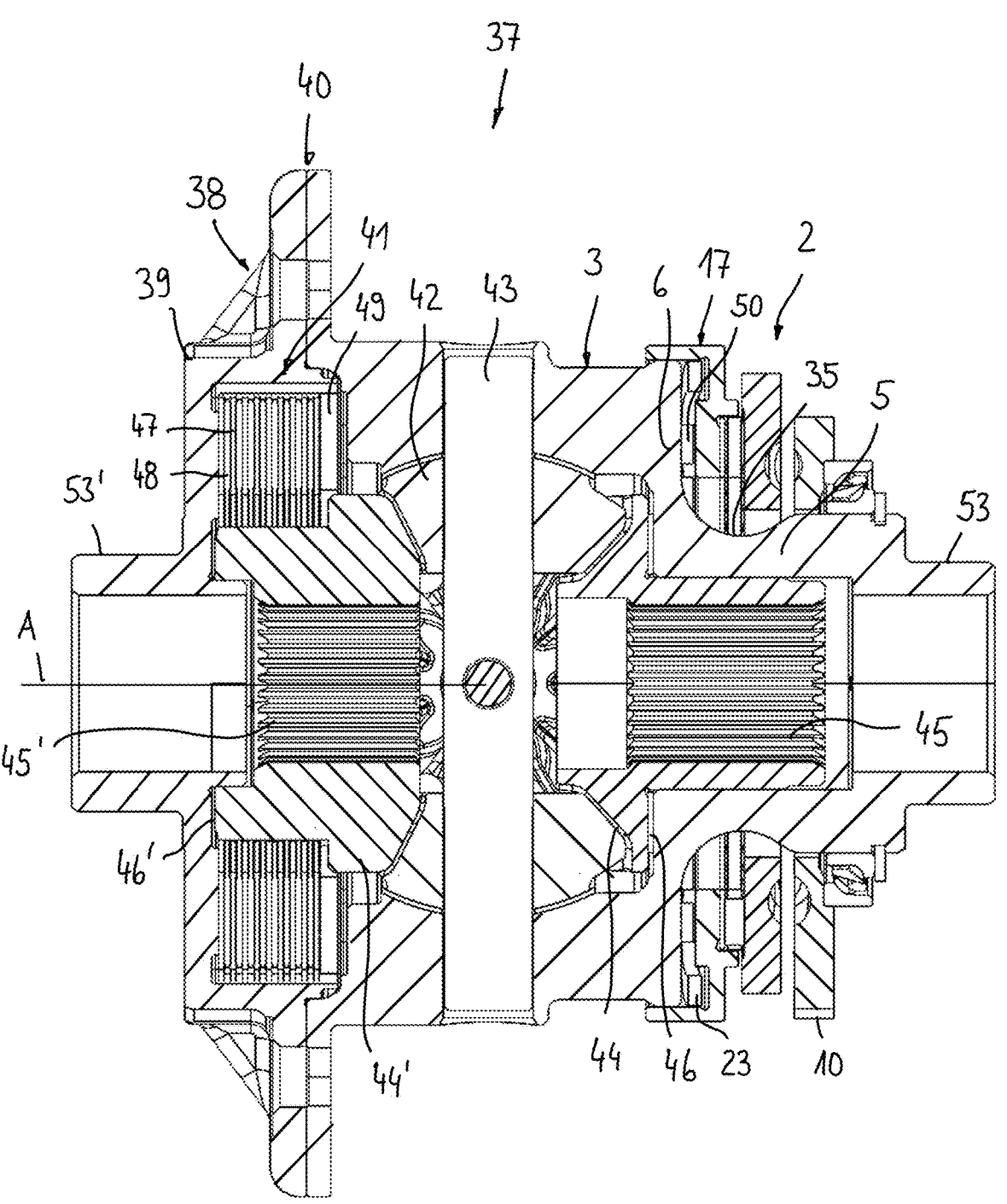
FIG. 2A shows a differential assembly with an actuator assembly as shown in FIGS. 1A and 1B in longitudinal section in a first sectional plane in a first embodiment.
Figure 2B:
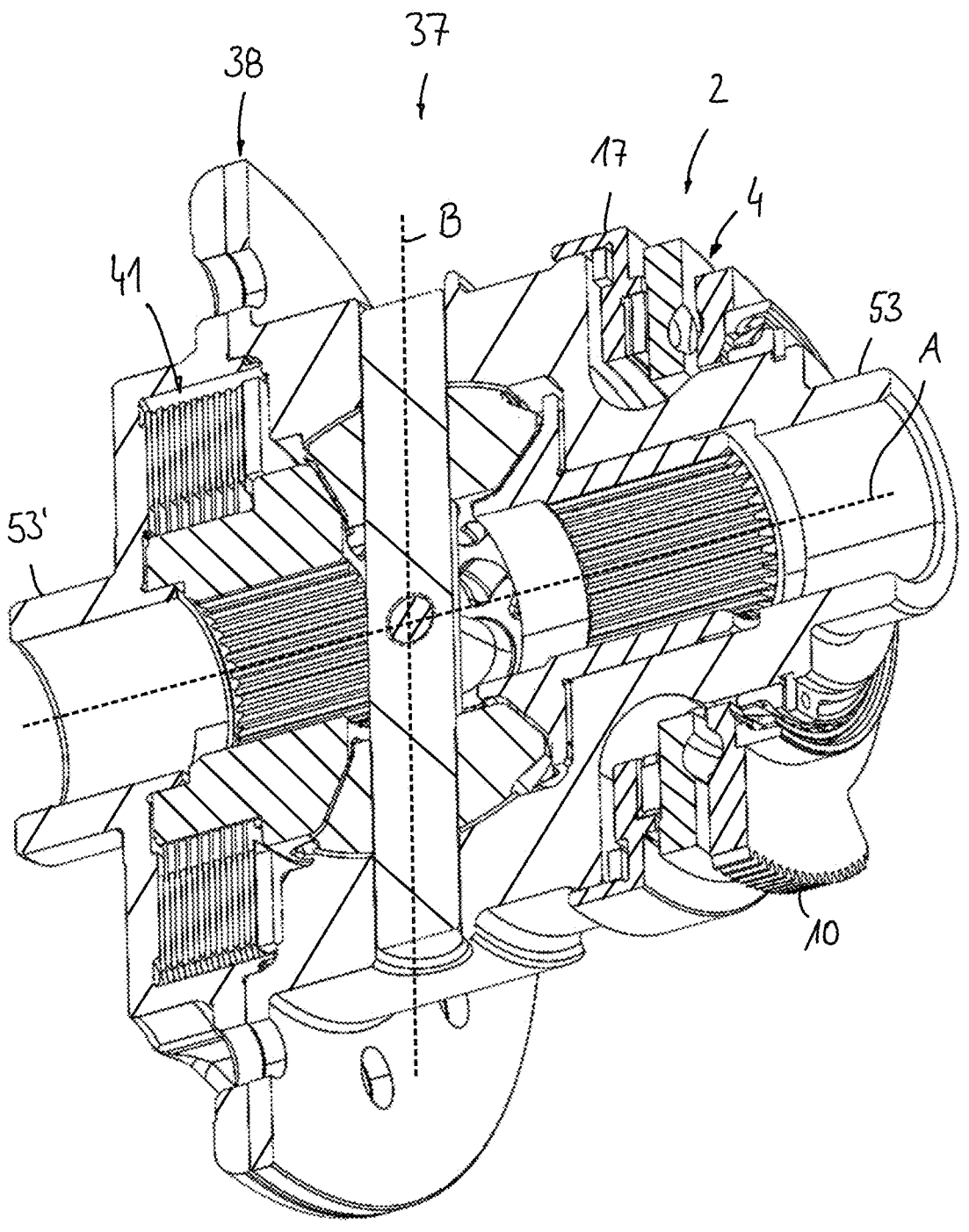
FIG. 2B shows a perspective view of the differential assembly from FIG. 2A.
Figure 2C:
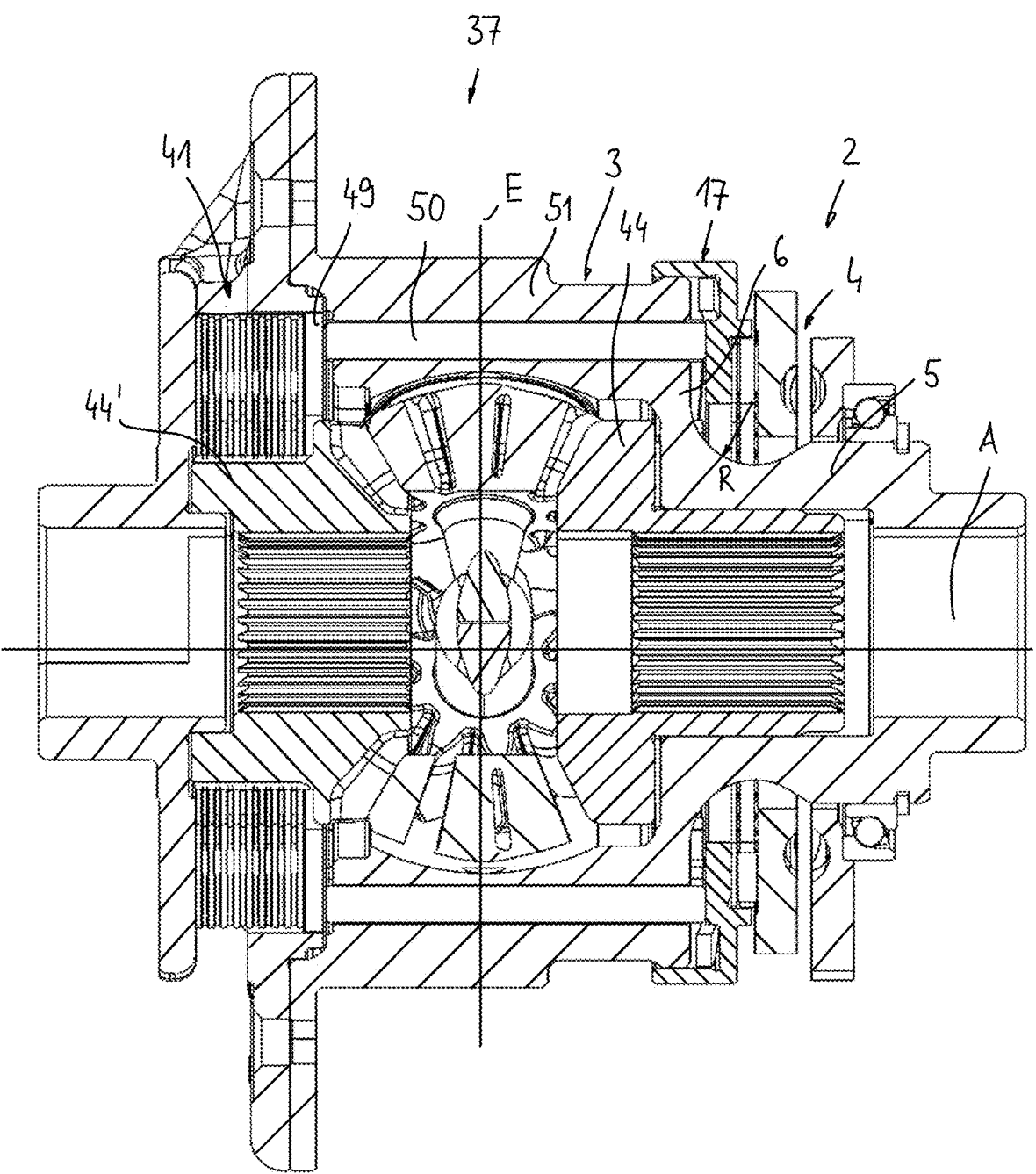
FIG. 2C shows the differential assembly from FIG. 2A in longitudinal section in a second sectional plane.
Figures 2D, 4:
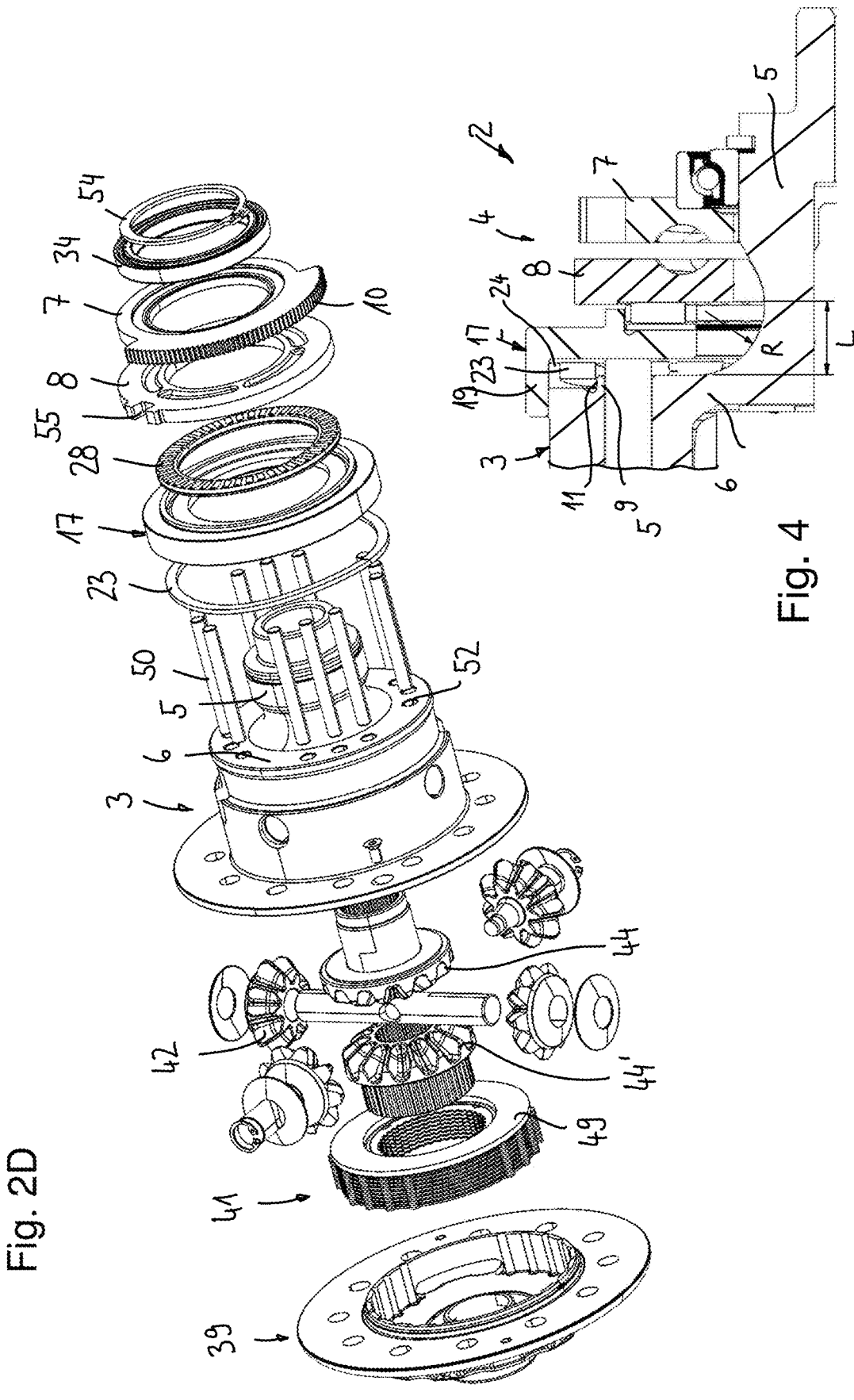
FIG. 2D shows an exploded perspective view of the differential assembly from FIG. 2A.
FIG. 4 shows an actuator assembly according to the invention in a modified embodiment in semi-longitudinal section.
Figure 3:
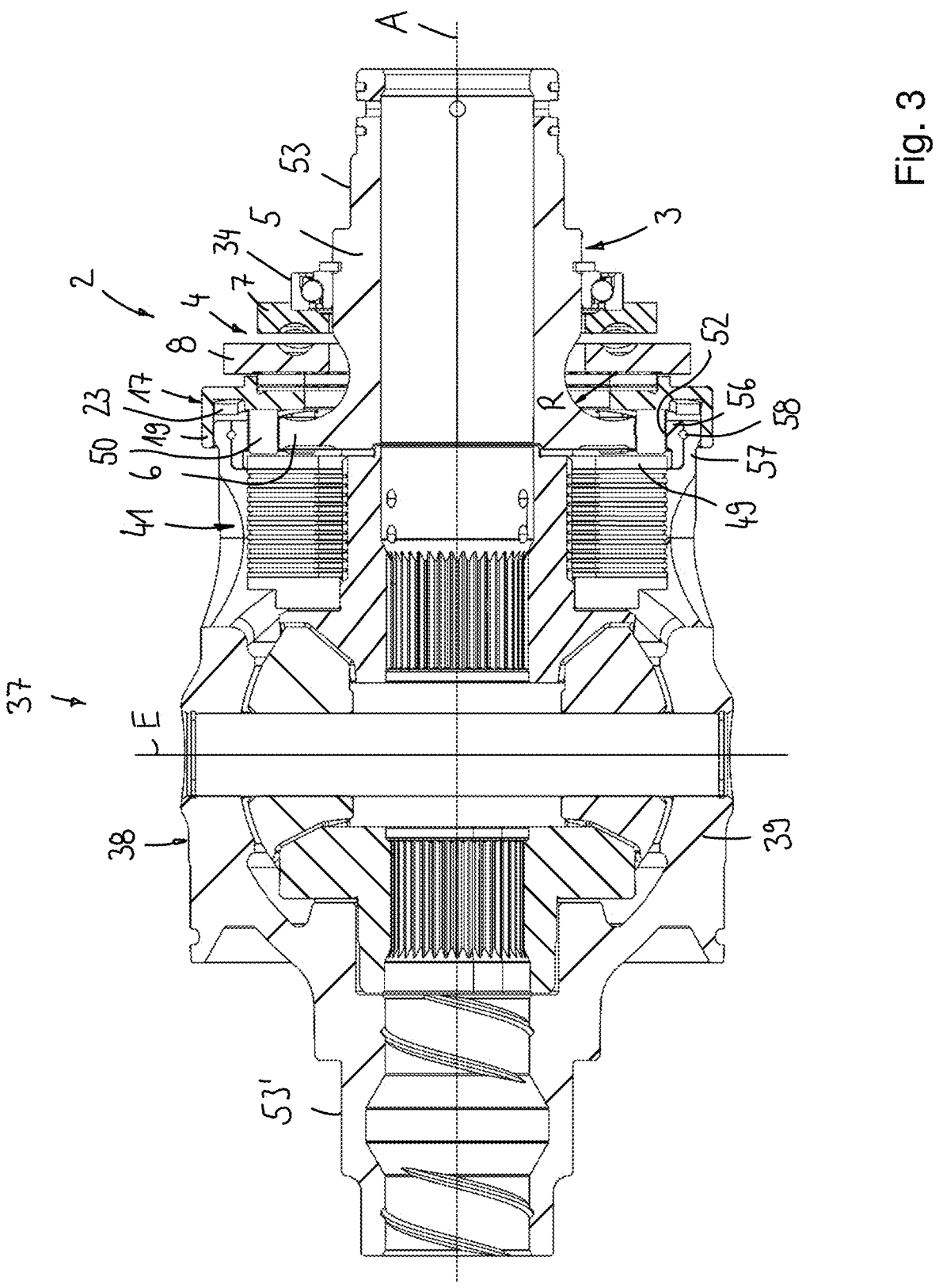
FIG. 3 shows a differential assembly with an actuator assembly according to FIGS. 1A and 1B in longitudinal section in a second embodiment.

FIG. 3 shows a differential assembly 37 in a second embodiment with an actuator assembly 2. In terms of structure and mode of operation, this substantially corresponds to that shown in FIG. 2, to the description of which reference is made in this respect. Identical and/or corresponding components are provided with the same reference signs as in FIG. 2.

In contrast to the above embodiment, the friction disc clutch 41 and the ball ramp mechanism 4 are arranged on the same side in relation to the plane E spanned by the differential gear axes B in the differential case 38. In this embodiment, the circumferentially distributed force transmission elements 50 are shorter and extend axially through the side wall of the differential case 38. In the present embodiment, the actuating element 17 is also arranged with its centring portion 19 axially displaceable on the outer face of the differential case 38. In the present embodiment, the differential case 38 comprises a pot-shaped housing part 39, in which the differential and the clutch are accommodated, as well as the housing part 3, which is formed here as a cover part. The housing part 3 has a connecting flange 56, which is inserted into a sleeve projection 57 of the pot-shaped housing part 39 and is firmly connected thereto, including by means of a weld joint 58, without being restricted to it. The actuator assembly 2 corresponds to that shown in FIGS. 1 and 2 in terms of its structure and mode of operation, to the description of which reference is made in this respect.

FIG. 4 shows an actuator assembly 2 in a modified embodiment. This largely corresponds to the embodiment shown in FIGS. 1A to 1B above, to the description of which reference is made in this respect. The same and/or corresponding details are provided with the same reference signs as in the figures above.

The only difference is that the annular spring element 23 in the embodiment shown in FIG. 4 is not held radially on an inner circumferential face in the centring portion 19 of the actuating element 17, but on an outer circumferential face 11 of a shoulder 59 of the housing part 3. As in the above embodiments, the spring element 23 is arranged in particular with radial play in the receiving space 24.

It is understood that the actuator assemblies 2, respectively arrangements, according to the invention are not limited to the applications described above, but can be used in any other devices in the driveline of a motor vehicle. For example, an actuator assembly 2 can also be used to actuate a hang-on clutch or a so-called twinster clutch arrangement, which does not require a differential.

LIST OF REFERENCE SIGNS

2 actuator assembly
3 housing part
4 ball ramp mechanism
5 sleeve-shaped portion
6 flange portion
7 support ring
8 setting ring
9 drive source
10 toothed segment
11 circumferential face
12 pinion
13 end face
14 end face
15 ball groove
16 ball groove
17 actuating element
18 flange portion
19 centring portion
20 guiding face
21 outer circumferential face
22 inner circumferential face
23 spring element
24 receiving space
25 side wall
26 Actuating face
27 offset portion
28 axial bearing
29 collar
30 washer
31 differential gearing
32 recess
33 bearing seat
34 rotary bearing
35 transition portion
36 outer face 37 differential assembly
38 differential case
39 housing part/cover part
40 connecting flange
41 friction disc clutch
42 differential gear
43 bolt
44, 44' side shaft gear
45 shaft splines
46 thrust washer
47 outer disc
48 inner disc
49 pressure plate
50 force transmission element
51 casing portion
52 through opening
53, 53' bearing seat
54 retaining ring
55 anti-rotation elements
56 connecting flange
57 sleeve projection
58 connection/weld joint
59 shoulder
A axis or rotation
B differential gear axes
E plane
L distance
R radius

The invention claimed is:

1. An actuator assembly for operating a friction disc clutch in the driveline of a motor vehicle, comprising:
a housing part with a sleeve-shaped portion and a flange-shaped portion;
a ball ramp mechanism with a support ring, which is axially supported against the housing part, and a setting ring, which is axially movable, wherein at least the support ring is radially spaced from an outer face of the sleeve-shaped portion of the housing part,
an actuating element which is axially movably held coaxially to the ball ramp mechanism on the flange-shaped portion of the housing part, wherein an annular gap is formed between an outer face of the sleeve-shaped portion and the actuating element, with the actuating element on one side being axially supported at least indirectly against the setting ring and having on an opposite side an actuating face for acting on the friction disc clutch, and
a spring element which is arranged radially externally of the actuating face of the actuating element axially between the housing part and the actuating element in order to exert a resilient restoring force on the actuating element which is opposed to the actuating force of the ball ramp mechanism.

2. The actuator assembly according to claim 1, wherein the flange-shaped portion has a plurality of axial through openings around the circumference, and
wherein the actuating element comprises a flange portion, which includes the actuating face and has a radial overlap with the through openings, and a centering portion, which extends from a radially outer end of the flange portion in an axial direction and embraces the housing part.

3. The actuator assembly according to claim 2, wherein the centering portion has an inner circumferential face which is axially movably guided on an outer circumferential face of the housing part.

4. The actuator assembly according to claim 2, wherein a receiving space for receiving the spring element is formed between the flange portion of the actuating element and a side wall of the housing part, the receiving space being arranged radially externally of the axial through openings.

5. The actuator assembly according to claim 1, wherein the spring element is annular in shape and is held radially on a circumferential face of the actuating element or of the housing.

6. The actuator assembly according to claim 1, wherein the spring element is a wave spring.

7. The actuator assembly according to claim 1, wherein the support ring is rotatably drivable by a drive source, and the setting ring is held in a rotationally fixed and axially movable manner, wherein the support ring and the setting ring respectively have on end faces facing each other a plurality of ball grooves extending in the circumferential direction, in each of which a ball is guided, wherein the ball grooves are designed such that a rotary movement introduced into the support ring is converted into an axial movement of the setting ring, and
wherein an axial bearing is arranged axially between the setting ring and the actuating element, wherein the actuating element has an axially projecting collar against which the axial bearing is radially supported.

8. The actuator assembly according to claim 7, wherein centre points of the balls received in the ball grooves have a radial overlap with the axial bearing.

9. The actuator assembly according to claim 1, wherein the sleeve-shaped portion of the housing part has a bearing seat on which a rotary bearing for the support ring is positioned, wherein the housing part has a concave transition portion between the flange-shaped portion and the bearing seat of the sleeve-shaped portion, which concave transition portion extends axially from a side face of the flange-shaped portion at least as far as the setting ring.

10. The actuator assembly according to claim 9, wherein a smallest outside diameter of the concave transition portion is smaller than the outside diameter of the bearing seat for the rotary bearing, and
wherein the concave transition portion has a curvature whose radius is at least 0.5 times a smallest axial distance between the setting ring and the side wall of the housing part.

11. The actuator assembly according to claim 1 in a differential gearing assembly that comprises:
a differential gearing with a differential case rotatably drivable about an axis of rotation, a plurality of differential gears rotatably supported in the differential case about gear axes extending at an angle to the axis of rotation, and a first side shaft gear and an opposite second side shaft gear, which are mounted in the differential case coaxially to the axis of rotation and engage with the differential gears, and
the friction disc clutch with outer discs, which are connected to the differential case in a rotationally fixed and axially movable manner, and inner discs, which are connected to one of the first and second side shaft gears in a rotationally fixed and axially movable manner, wherein a disc pack formed by the outer discs and inner discs is axially loadable via a pressure plate,
wherein the differential case comprises the housing part on which the actuating assembly is arranged, and wherein a plurality of force transmission elements are provided distributed over the circumference, which extend axially through the through openings of the housing part in order to transmit an axial movement of the setting ring to the pressure plate of the disc pack.

12. The actuator assembly according to claim 11, wherein the actuating element is arranged between the setting ring and the force-transmitting elements, with the force-transmitting elements being in contact with a contact surface of the actuating element.

13. The actuator assembly according to claim 11, wherein the friction disc clutch and the ball ramp mechanism are arranged on opposite sides of the differential case with respect to a plane spanned by the differential gear axes, with the circumferentially distributed force transmission elements extending axially through the differential case and being axially guided therein.

14. The actuator assembly according to claim 11, wherein the differential case has a first bearing seat and a second bearing seat in order to be rotatably mounted by bearing elements in a stationary differential housing, wherein the differential case has a connecting flange to which a drive gear is firmly connectable for introducing torque, and wherein a smallest axial distance between the first bearing seat and the second bearing seat is smaller than an average diameter of at least one of at least one of the connecting flange or drive gear.

15. The actuator assembly according to claim 11, wherein the friction disc clutch and the ball ramp mechanism are arranged on the same side of the differential case with respect to a plane spanned by the differential gear axes, with the circumferentially distributed force transmission elements extending axially through a side wall of the differential case and being axially guided therein.

* * * * *